United States Patent [19]
Forster et al.

[11] 3,797,516
[45] Mar. 19, 1974

[54] SYSTEM FOR CONTROLLING THE GAS PRESSURE IN A CLOSED GAS RECIRCULATION INSTALLATION

[75] Inventors: Siegfried Forster, Alsdorf; Karl-Uwe Schneider, Betzdorf, both of Germany

[73] Assignee: Kernforschungsanlage Lulich Gesellschaft mit beschankter Haftung, Julich, Germany

[22] Filed: Sept. 13, 1971

[21] Appl. No.: 179,897

[30] Foreign Application Priority Data
Sept. 18, 1970 Germany............................ 2046078

[52] U.S. Cl.................... 137/340, 137/568, 60/416
[51] Int. Cl............................................. F16k 49/00
[58] Field of Search....... 137/340, 568, 566; 138/26, 138/30; 60/416

[56] References Cited
UNITED STATES PATENTS

| | | | |
|---|---|---|---|
| 2,404,395 | 7/1946 | Milliken | 60/39.18 C |
| 2,608,054 | 8/1952 | Price | 60/39.18 C |
| 3,680,311 | 8/1972 | Hatbonn et al. | 60/416 X |
| 3,044,481 | 7/1962 | Regan | 137/571 X |
| 3,221,757 | 12/1965 | Newton, Jr. | 137/340 X |
| 3,540,482 | 11/1970 | Fulmer | 138/30 |
| 2,924,944 | 2/1960 | Matlachowsky | 138/30 X |
| 3,932,322 | 4/1960 | Mercer | 137/517 X |
| 2,944,401 | 7/1960 | Beck | 137/517 X |
| 2,979,074 | 4/1961 | Yanda | 137/340 |
| 3,572,381 | 3/1971 | Nash | 137/568 |

*Primary Examiner*—Samuel Scott
*Attorney, Agent, or Firm*—Karl F. Ross; Herbert Dubno

[57] ABSTRACT

A system for controlling a closed gas-circulation installation, such as a gas-cooled nuclear reactor connected with a gas turbine for driving an electric generator, in which a bank or battery of pressure accumulators can be successively connected with the high-pressure side of the installation by individually set pressure-responsive valves for successive charging to different pressure levels when a charging valve common to the manifold of the accumulators is operated. When a discharging valve is operated, the manifold is connected to the low-pressure side of the installation and the accumulators successively discharge in stages. The system is used to control the rate of operation or to compensate for variations in the rate of operation of the turbine.

18 Claims, 2 Drawing Figures

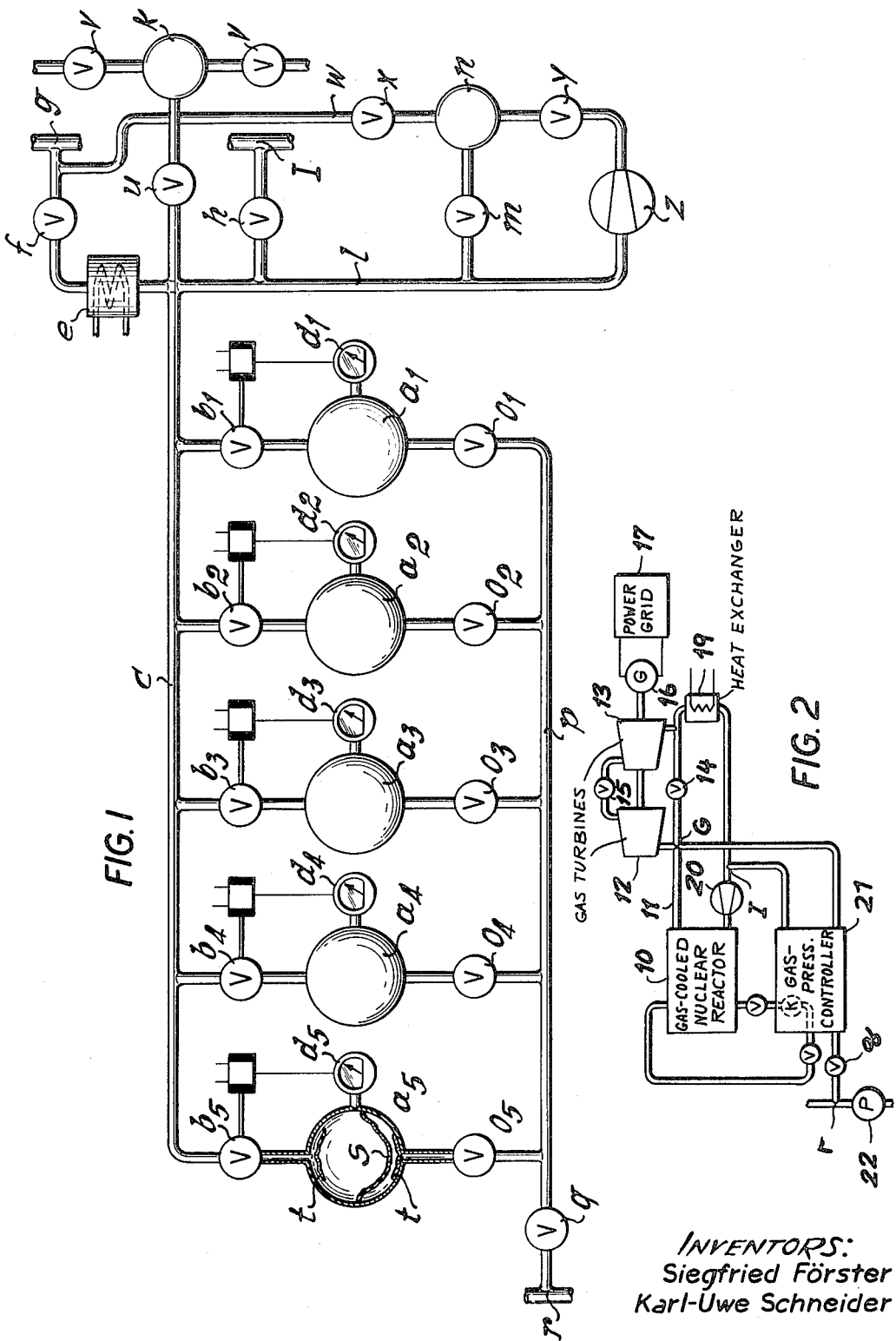

3,797,516

SYSTEM FOR CONTROLLING THE GAS PRESSURE IN A CLOSED GAS RECIRCULATION INSTALLATION

FIELD OF THE INVENTION

Our present invention relates to an apparatus for controlling the gas pressure of a closed system and, more particularly, to an arrangement for regulating the gas pressure in a closed recirculation installation, operating at an elevated gas pressure.

BACKGROUND OF THE INVENTION

It has been proposed heretofore to regulate gas pressure in an installation operating at subatmospheric or superatmospheric levels by the use of pressure-control valves whose flow cross-section may be modified in respect to pressure, by accumulators or like pressure-storage vessels connected in parallel to a portion of the installation in which the pressure is to be maintained, and by combinations of the two. In general, these systems have proved to be unsatisfactory in many applications, especially those in which a gas is recirculated under pressure, i.e. a closed recirculating system for pressurized gases. Such a system may comprise a gas turbine, a source of turbine-driving gas under pressure for valves and vessels connected in a closed circuit therewith.

The gases may be heated in an energy-generating portion of the apparatus, e.g., by the transfer of heat to the gas or the generation of heat in the gas, the gas being supplied to the turbine for driving same. From the turbine, the depleted low-energy gas may be returned to the energy generator.

In power stations, for example, the thermal energy generated by any number of means is used to drive the turbine which, in turn, is connected to a load such as an electrical generator. Expansion of the gases converts thermal energy to the work of rotation of the electrical generator in which the mechanical work is converted to electricity. The net result of such a system is the conversion of thermal energy into electric power. In many power-generating systems of this type, steam constitutes the pressurized medium for transforming thermal energy into useful work in the form of rotation of the rotor of the turbine. In this case, water vapor at an elevated pressure is heated, generally superheated, by thermal energy produced by a nuclear reaction or by the combustion of fuel in a conventional boiler. In either case, the thermal energy is transferred to the water vapor which as a high-pressure gas, is fed to the turbine and expanded against the rotor blades thereof to drive the turbine and operate any load connected therewith. The depleted steam can then be returned to the heat source and the closed system or cycle continues.

It has also been proposed to use water-cooled nuclear reactors as heat sources for the gases used to drive the turbine. In this case, the water vapor introduced into the turbine may be heated directly by the reactor or indirectly by heat transfer from a primary fluid circulated through the reactor. This latter fluid is, of course, water in the water-cooled reactor and other liquid in metal-cooled reactors, e.g., metallic sodium or other low-melting metal.

In high-temperature reactors, through which gases such as helium are circulated, the primary fluid is a gas which may be heated to temperatures up to 800°C and used directly as a source of driving energy for the turbine.

In all of the aforedescribed systems and for gas-turbine arrangements generally, it may be desirable to adjust the output of the turbine to the requirements on the load side of the installation. For example, with increasing loads, it may be desirable to increase the pressure and vice versa. Accordingly, it has been suggested to provide storage reservoirs or accumulators which are charged with gas under pressure during low-demand operation of the system and to return the stored gas to the closed recirculation path with increasing demand and upon reduction in the pressure along this path. In other words, the gas supply is reduced or increased, at least in part, by the transfer of gas to and from the accumulators, respectvely when, for example, the gas pressure is reduced in the recirculating path as a result of withdrawal of gas from the system. The system may have a high-pressure location at which the gas is withdrawn, and a low-pressure location at which the stored gas is returned to the turbine gas circulation system. In practice, it has been found that all such systems require an excessive storage volume, complex control apparatus and highly expensive equipment to monitor the operation of the turbine circulation path.

More specifically, pressure-storage vessels connected in parallel, or a single large storage vessel, have been connected in the past by suitable valves to the high-pressure and low-pressure points of a gas-circulation path, e.g., for turbine operation. The buildup of excess gas pressure is relieved by storing the gas in the parallel-connected accumulators or in the single accumulator, and reduced pressures are compensated by bleeding gas from the parallel-connected storage vessels or the single-storage vessel into the gas-circulation path at the low-pressure point thereof. We have mentioned that such systems are characterized by the need for large storage volumes and hence a large number of storage vessels or a single pressure-storage vessel of very high capacity. These requirements markedly increase the cost of the system.

OBJECTS OF THE INVENTION

It is the principal object of the present invention to provide a system for controlling the gas pressure of a gas-circulation installation of the closed type with low equipment cost, high effeciency and the ability to compensate for wide variations in the pressure of the circulation system.

Another object of this invention is to provide an improved system for controlling an electricity-generating plant operating with a closed gas cycle in which the gas volume and pressure requirements can be closely compensated upon variation in electrical demand.

Yet a further object of this invention is to provide a system for the improved regulation of the gas pressure of a closed gas cycle which avoids the aforementioned disadvantages and effectively reduces the size of pressure-storage volume which must be supplied by comparison with earlier systems.

SUMMARY OF THE INVENTION

These objects and others which will become apparent hereinafter are attained, in accordance with the present invention, in a system for controlling the gas pressure in a closed gas-circulation installation, preferably an installation having a gas turbine, in which a plurality of pressure accumulators (pressure storage vessels) are connected across the high-pressure and low-pressure sides of the gas-circulation path in parallel but through respective pressure-responsive valves designed to automatically open and close at respective thresholds to maintain successively higher pressure in the successive accumulators. More specifically, each of the pressure accumulators is provided with an adjustable valve which is set so that the accumulators at gas intake are charged in succession each with gas under successively higher pressures when the gas pressure in the turbine circulation lies only slightly below a maximum pressure to be sustained in the circulating path. In other words, the pressure sensors are so adjusted (individually) that the pressure accumulators are successively charged at a pressure only slightly below that to be sustained at the high-pressure side of the circulating path and, during return of gas to the path, are discharged in succession at pressures only slightly above that maintained at the low-pressure side of the closed path. The pressure-control valves according to the invention are connected to a line which may be tied to the high-pressure and low-pressure sides via respective accumulator-charging and accumulator discharging valves which may be automatically or manually controlled in accordance with the operating conditions in the usual gas cycle.

With this system it is possible to maintain the pressure for diminished or increased gas flow rates and thus compensate the pressure and the volume of the gases delivered to the turbine in accordance with the power needs thereof and thereby allow the energy supply source, e.g., a nuclear reactor, to operate at optimum efficiency. In practice, the stepped-pressure accumulator system has been found to result in a reduction of the total storage capacity of a system to a sixth of that previously required while permitting variations in the turbine operating rates of up to 60%.

According to another feature of this invention, the effective storage capacity is increased by cooling the gas withdrawn from the circulating path before it is introduced into the accumulator system. To this end, a heat exchanger or cooler is provided in the supply line running between the intake or charging valve (high-pressure side) and the pressure line of the accumulators. A significant advantage of the system of the present invention is that it permits possible gas losses from the gas circulation to be equalized using the pressure accumulators or pressure-storage vessels. To this end, the gas circulation is provided with one or more spaces connected by a valve or the like with the pressure-storage vessels and adapted to be cut off from the remainder of the circulation. Furthermore, the possible gas loss may be compensated additionally by the provision of a high-pressure accumulator which is connected by valve means with the spaces mentioned earlier. In the chambers, we may maintain a pressure equal to the pressure in the gas-circulation path and, when additional gas is required in the latter, a slightly higher pressure from the battery of accumulators may be applied to these chambers. If this is insufficient, the high-pressure accumulator is connected to the chamber and the connection from the accumulator battery or the high-pressure accumulator maintained as long as is necessary to result in a pressure-equilibrium between the chamber and the accumulator. The space or chamber may in fact be the chambers traversed by the circulation path. For example, when the energy source is a nuclear reactor, the chamber may be a compartment of the nuclear reactor in which losses are compensated.

The high-pressure accumulator can also be used, if desired, to charge gas into the circulation system through the high-pressure side, thereby affecting this charging gas at a high rate. In this manner, a small but rapid increase in the output of the installation can be gained and the pressure in the closed circulating path can be brought to a higher level more quickly than by charging the gas into the path at the low pressure side from the battery of pressure accumulators. Part of all of the pressure for replenishing the high-pressure accumulator can be derived from the battery of pressure accumulators via a suitable valve.

Furthermore, we provide means for increasing the pressure in the accumulators beyond their charging pressures, preferably in the form of a fluid which is introduced into the accumulators of the battery at low points thereof. The latter fluid may be a gas or a liquid, e.g., a liquefied gas, a low-temperature gas or a liquid at ambient temperature and the pressure of the respective accumulator, it being noted that mixing of the working gas with the pressurizing fluid can be minimized by choosing as the pressurizing fluid, a fluid having a higher density than that of the working gas. Mixing may also be prevented in the accumulator of the battery by providing a membrane therein which is connected along the equator of the preferably spherical accumulator to the wall of the latter and by dimensioning the flexible membrane so that it hugs the wall of a hemisphere when the accumulator volume is fully charged with the working gas or is filled by the pressurizing fluid. Effective sealing of the accumulator can be gained by providing plates slidable within predetermined limits within the accumulator and overlying the inlet and outlet ports thereof. In combination with the flexible membrane, such plates provide sufficient gas-tight sealing of the accumulator.

The pressure detectors which control the two-way valves connecting each accumulator of the battery to the manifold or pressure line, may be adjusted for 1, 2, 3 . . .$n$ pressure accumulators so that if a pressure $P_{max}$ is to be maintained at the high-pressure side and the actual pressure $P^*$ is detected there, the first valve will open at a pressure $P_{max} + \Delta P = P_1$, the second accumulator will be charged as its valve opens at a pressure $P_2 = P_{max} + 2\Delta P$, the third valve opens at a pressure $P_3 = P_{max} + 3\Delta P$ and the process continues in a stepwise manner until the final accumulator is charged with a pressure $P_n = P_{max} + n\Delta P$. The pressures are so dimensioned that all of the valves open at pressures only slightly below the level in the circulating line. As a result, the first, second, third . . .$n^{th}$ accumulators are charged with pressures of $P_1, P_2, P_3 \ldots P_n$ respectively. The actual pressure maintained in the circulating path during charging of the accumulators is thus determined by the relationship $$P_{max} = P^* - f\left(\sum_{n}^{1} \Delta P\right)$$

where the function is required because the pressures are not truly additive unless the volumes of the accumulators and the circulation path, and the temperatures of accumulated and circulating gases are equal. Similarly, when a minimum pressure is to be maintained in the circulating path, the first valve may open at a pressure $P'_1 = P_{min} + \Delta P$, the second valve will open at a pressure $P'_2 = P_{min} + 2\Delta P$, the third valve at a pressure $P'_3 = P_{min} + 3\Delta P \ldots P'_n = P_{min} + n\Delta P$. The actual pressure $P'$ in the system will thus be determined by the relationship $$P' = P_{min} + f\left(\sum_n^1 \Delta P\right).$$

DESCRIPTION OF THE DRAWING

The above and other objects, features and advantages of the present invention will become more readily apparent from the following description, reference being made to the accompanying drawing in which:

FIG. 1 is a flow diagram of the control system of the present invention; and

FIG. 2 is a diagram of the gas-circulation path in somewhat idealized form.

SPECIFIC DESCRIPTION

Referring first to FIG. 2 of the drawing, we have shown a nuclear-powered generating plant for electrical energy which comprises a gas-cooled nuclear reactor 10 of any conventional type, e.g., as described at pages 139 ff. of the CONCISE ENCYCLOPAEDIA OF NUCLEAR ENERGY, Interscience Publishers, 1962. The nuclear reactor forms the energy source for a gas-circulating system including a line 11 leading to the gas turbines 12 and 13 which are controlled by valves 14 and 15 and operate a generator 16 connected to the power grid 17. The gas turbines may be of the type described at pages 9 - 173 ff. of MARKS' MECHANICAL ENGINEERS' HANDBOOK, McGraw Hill Book Co, 1958. The hot gas returned may be cooled by heat exchanger 19 and the low pressure gas delivered by a compressor 20 to the nuclear reactor. The gas-pressure controller 21, which is constructed as described with reference to FIG. 1, has a first connection G to the high-pressure side of the gas-circulation path and another connection I to the low-pressure side. Furthermore, a line $r$ may be provided to supply another fluid under pressure and the interior of the nuclear reactor 10 may form a space connected with valve $v$ for isolating it from the gas-circulation path or for connecting this chamber to a chamber $k$ within the controller for purposes which will become apparent hereinafter.

In FIG. 1, we have shown a controller having five pressure accumulators $a_1, a_2, a_3, a_4$ and $a_5$, constituting a bank, it being understood that the number of pressure accumulators can be increased or decreased depending upon requirements. The pressure accumulators $a_1 - a_5$ are connected via the valves $b_1, b_2, b_3, b_4$ and $b_5$ respectively with a pressure line $c$ which, in turn, is connected to the circulating path of the turbine gas as will be apparent below. To vary the output of the gas turbine, the pressure accumulators $a_1 - a_5$ may be connected via line $c$, and a charging valve $f$ with the highest pressure point $g$ of the closed circulating path or by the discharge valve $h$ to the lowest pressure point $i$ of the circulating path. For each of the valves $b_1 - b_5$, there is provided a respective pressure regulator or sensor $d_1 - d_5$ arranged to automatically open or charge at the pressure levels $p_1, p'_1$, etc. described above. Hence the pressure accumulators $a_1 - a_5$ automatically are charged one after the other from a high pressure at the high-pressure side or are discharged into the circulation path one after the other through the discharge valve. The sensors $d_1 - d_5$ are connected to the respective accumulators and respond to the pressures therein.

As is also apparent from FIG. 1, the charging valve $f$ and the high-pressure side $g$ are provided with a cooler $e$ (e.g., a water-operated heat exchanger) adapted to cool the gases withdrawn from the circulating path and supplied to the accumulators $a_1 - a_5$, thereby reducing the storage volume by the amount resulting from thermal contraction of the gases.

The manifold $e$ leading to all of the accumulators $a_1 - a_5$ is also connected to a valve $m$ leading to a high-pressure accumulator $n$. The high-pressure accumulator $n$ is also connected via a line $w$ directed with the high-pressure side of the circulation path by a valve $x$. A valve $y$ connects a compressor $z$, whose low-pressure side is tied to a manifold $c$, to the high-pressure accumulator $n$.

The aforementioned space $k$, which is separated by a valve $u$ from manifold $c$, is isolated by the valves $v$ from the main gas circulation.

The high-pressure accumulator $n$ serves, in conjunction with the accumulators $a_1 - a_5$, to equalize gas losses in the circulating path and/or to adjust the pressure in the main circulating path via the chamber $k$ and the valves $v$. Thus valves $v$ may be opened to raise the pressure in chamber $k$ above the operating temperature of the circulating path at which it is when valves $v$ are closed to isolate this chamber, whereupon one or both of the valves $v$ may be opened. The high-pressure accumulators $n$ can be applied via valve $m$ and valve $u$ to the chamber $k$ when the accumulator battery has been depleted. Furthermore, when it is desired to supply gas at a high rate to the circulating path, valve $x$ may be opened to discharge the previously charged accumulator $n$ directly into the circulating path. The accumulators $a_1 - a_5$, of course, operate in succession until pressure equalization with chamber $k$ is reached, whereupon the pressure in chamber $k$ can be increased still further by applying the pressure from accumulator $n$. The pressure in accumulator $n$ can be built up during times of no demand upon this accumulator by the compressor $z$ which is connected by line 1 to manifold $c$.

The accumulators $a_1 - a_5$ are also connected via valves $o_1 - o_5$ with a manifold $p$ which can be maintained at a variable pressure via a valve $g$ connected to a supply line $r$ for a higher density fluid.

In FIG. 2, the line $r$ is shown to be provided with a liquid-displacement pump 22. The fluid in line $p$ has a higher density than the working fluid in line $c$ and is delivered to the the accumulators $a_1 - a_5$ at the lowest points thereof. The system $r, p, o_1 - o_5$ permits the pressure in the accumulators $a_1 - a_5$ to be adjusted to a pressure in excess of that delivered at the high-pressure side $g$ of the circulating path. The higher pressure may be used to equalize the pressure in chamber $k$ or to provide the elevated pressure in the accumulators which charge the circulation path. It is also possible to provide a fluid-pressurizing system of similar construction for the high-pressure accumulator $n$ in which case the compressor 2 may be omitted or used only as an additional pressure source.

As noted earlier, it has been found to be advantageous in obtaining a maximum increase in the operating range of the turbine for a given accumulator volume, when the walls of each accumulator are sealed along their equators to respective gas-tight membranes $s$ having a surface area equal to the internal hemispherical surface area of the spherical accumulators $a_1 - a_5$. The membrane $s$ thus has dimensions such that it can lie and hug the wall of the accumulator when one or another fluid fills the latter. In addition, plates $t$ are provided to cover the ports communicating with the accumulators $a_1 - a_5$ but are shiftable within a limited distance and serve to support the membrane when the latter is forced thereagainst. The plates and the membrane cooperate to seal the reservoir. It should be understood that the plates alone do not act as sealing members. The accumulators $a_1 - a_5$ are shown to have equal volumes although, in many cases, the volumes may differ from one accumulator to the next.

The improvement described and illustrated is believed to admit of many modifications within the ability of persons skilled in the art, all such modifications being considered within the spirit and scope of the invention except as limited by the appended claims.

We claim:

1. A system for controlling the gas pressure of an installation having a closed gas-circulating path including an energy generator and a gas turbine and provided with a high-pressure line, a charging valve connecting said pressure line to said high-pressure side and a discharging valve for connecting said pressure line to said low-pressure side, a battery of pressure accumulators each connected to said pressure line, and a respective pressure-responsive valve connecting each of said pressure accumulators with said pressure line and operable at successive stepped pressure levels for charging and discharging said accumulators in succession.

2. The system defined in claim 1, further comprising gas-cooling means between said high-pressure side and said battery for reducing the temperature of gases charged thereto.

3. The system defined in claim 1 wherein each of said accumulators is provided with pressurizing means, said pressurizing means including a conduit communicating with the respective accumulator at a low point thereof for supplying to said accumulator a fluid of a higher density than that of the gas traversing said path.

4. The system defined in claim 1 wherein said accumulators are all of equal volume.

5. The system defined in claim 1 wherein each of said pressure-responsive valves includes a pressure sensor responsive to the pressure within the respective accumulator.

6. The system defined in claim 5 wherein said pressure-responsive valves are so constructed and arranged that said accumulators are charged with gas from said path in succession each at a pressure level only slightly below that at said high-pressure side and discharge in succession each at a pressure only slightly above that prevalent at said low-pressure side.

7. The system defined in claim 1 wherein each of said accumulators is provided with a membrane dimensioned to hug the wall of the accumulator and sealingly subdividing same into a compartment communicating with said pressure line and a further compartment, and means for charging said other compartment with a pressurizing fluid.

8. The system defined in claim 7 wherein each of said accumulators is provided with a respective plate overlying the conduits and movable limitedly within said accumulators for supporting said membranes.

9. The system defined in claim 8 wherein said accumulators are generally spherical.

10. A system for controlling the gas pressure of an installation having a closed gas-circulating path with a high-pressure side and a low-pressure side, said system comprising a pressure line, a charging valve connecting said pressure line to said high-pressure side and a discharging valve for connecting said pressure line to said low-pressure side, a battery of pressure accumulators each connected to said pressure line, a respective pressure-responsive valve connecting each of said pressure accumulators with said pressure line and operable at successive pressure levels for charging and discharging said accumulators in succession, said installation including a chamber and means for cutting same off from said path, said battery having a high-pressure accumulator at a high--pressure side thereof, a first valve connecting said high-pressure accumulator with said pressure line; a second valve connecting said high-pressure side of said path; a compressor connected between said line and said high-pressure accumulator; and a third valve between said compressor and said high-pressure accumulator.

11. The system defined in claim 10, further comprising gas-cooling means between said high-pressure side of said path and said battery for reducing the temperature of gases charged thereto.

12. The system defined in claim 10 wherein each of said accumulators is provided with pressurizing means, said pressurizing means including a conduit communicating with the respective accumulator at a low point thereof for supplying to said accumulator a fluid of a higher density than that of the gas traversing said path.

13. The system defined in claim 10 wherein said accumulators are all of equal volume.

14. The system defined in claim 10 wherein each of said pressure-responsive valves includes a pressure sensor responsive to the pressure within the respective accumulator.

15. The system defined in claim 14 wherein said pressure-responsive valves are so constructed and arranged that said accumulators are charged with gas from said path in succession each at a pressure level only slightly below that at said high-pressure side of said path and discharge in succession each at a pressure only slightly above that prevalent at said low-pressure side.

16. The system defined in claim 10 wherein each of said accumulators is provided with a membrane dimensioned to hug the wall of the accumulator and sealingly subdividing same into a compartment communicating with said pressure line and a further compartment, and means for charging said other compartment with a pressurizing fluid.

17. The system defined in claim 16 wherein each of said accumulators is provided with a respective plate overlying the conduits and movable limitedly within said accumulators for supporting said membranes.

18. The system defined in claim 17 wherein said accumulators are generally spherical.

* * * * *